March 13, 1973  J. R. LAMBERT  3,720,437
TRANSPORTER VEHICLES
Filed May 21, 1971  5 Sheets-Sheet 1
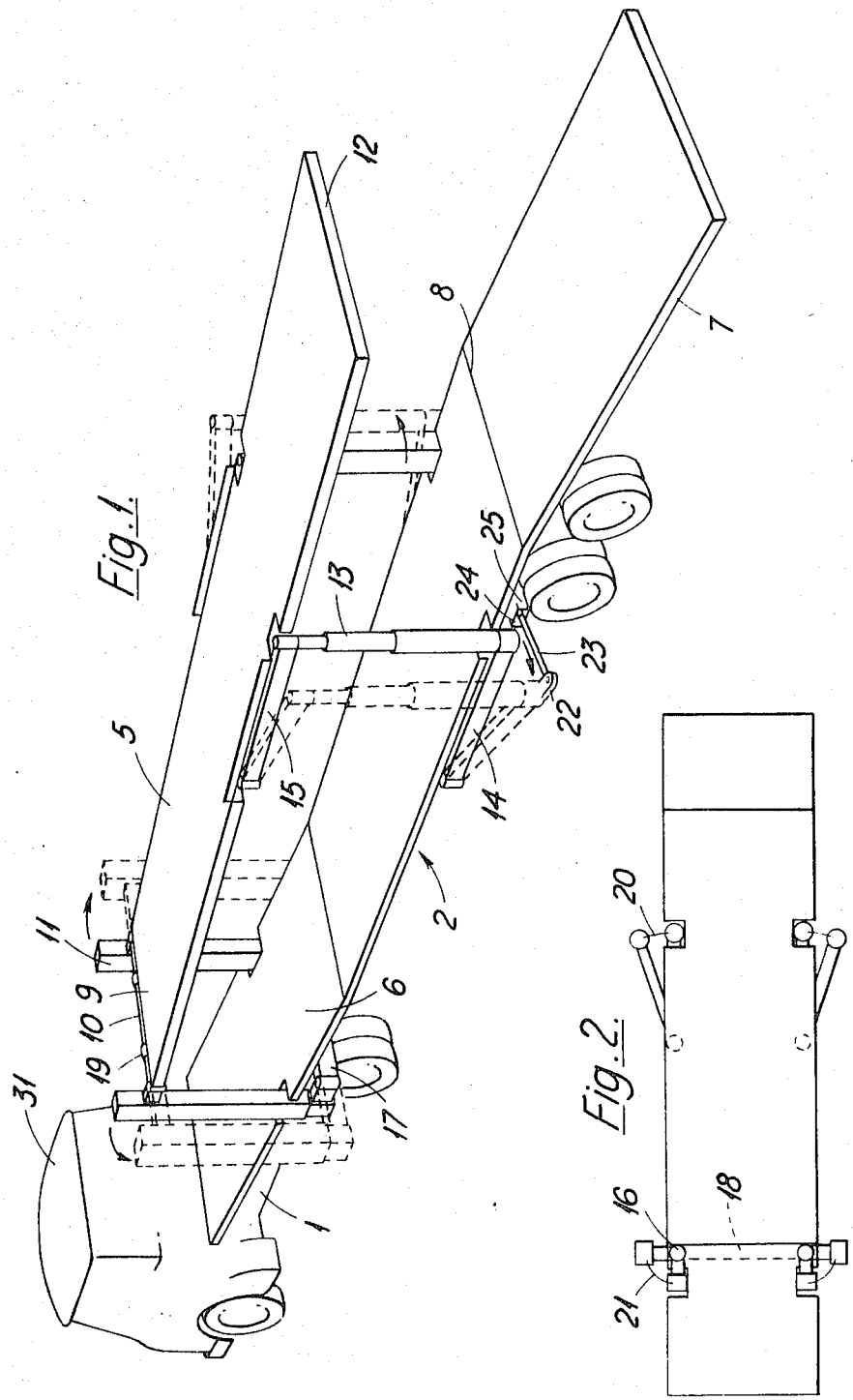
John Robert Lambert Inventor
By Peter H. Smolka
His Attorney

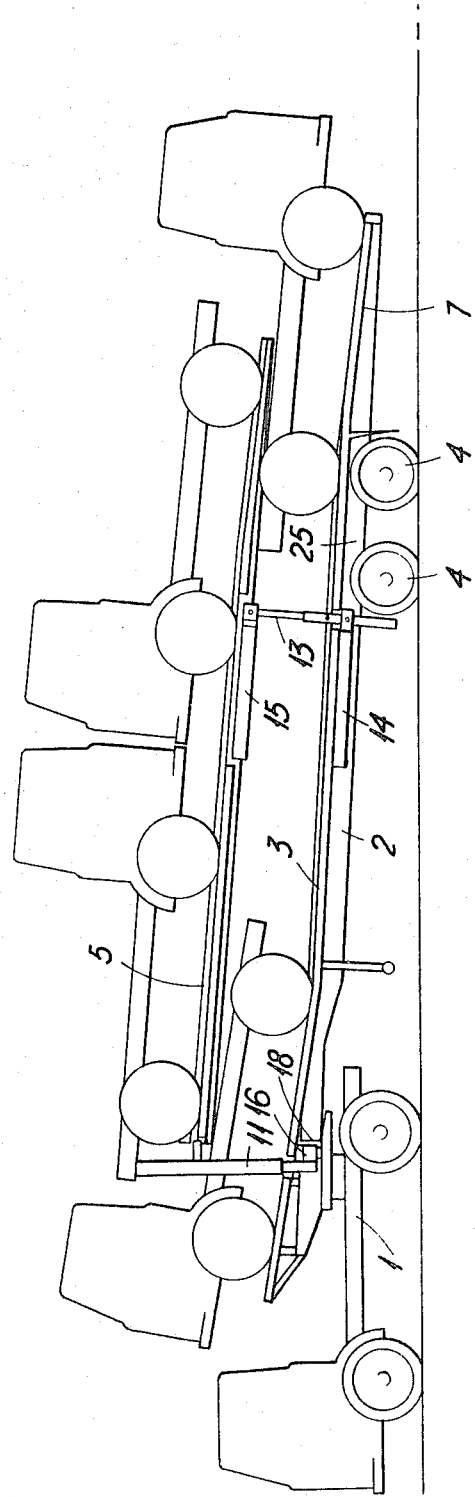

United States Patent Office  3,720,437
Patented Mar. 13, 1973

3,720,437
TRANSPORTER VEHICLES
John Robert Lambert, Birch, near Colchester, England, assignor to Redment Engineering Company Limited, Essex, England
Filed May 21, 1971, Ser. No. 145,769
Int. Cl. B60p 3/06
U.S. Cl. 296—1 A                12 Claims

ABSTRACT OF THE DISCLOSURE

A load carrying vehicle for transporting loads on two vertically spaced decks the upper of which may be raised and lowered at its lower end, comprising a wheeled chassis, self-propelled or semi-trailer, supporting a lower deck, an upper deck supported at its front and rear end portions above the lower deck on supports, the upper deck supports at least at the rear end being variable in height and mounted on members pivoted to the vehicle structure, including the upper deck, about vertical axes to permit outwards sideward swinging of the supports for mounting loads on the upper and lower decks.

BACKGROUND OF THE INVENTION

(1) Field of the invention

This invention relates to self-propelled or trailer transporter vehicles for carrying loads from one location to another including transporting vehicles from factories to delivery points such as docks. Such vehicles may be semi-trailers connectable to a tractor by a suitable coupling such as a fifth wheel coupling.

(2) Description of prior art

Such vehicles may have a load carrying lower deck onto which the loads may be mounted from the rear up a suitable ramp, and an upper deck capable of being raised or lowered by hand operated or power operated devices at the front end off and onto the lower deck; similarly the rear of the upper deck may be lowered for loading over a rearwardly directed ramp and may then be raised clear of the lower deck to permit loading of the lower deck.

The upper deck is vertically movable and supported on upstanding devices such as rigid uprights on the lower deck or the chassis of the vehicle. However, such known constructions have the uprights wtihin the outer sides or perimeter of the lower deck.

A controlling factor is the width of the transporter vehicle which is controlled by traffic authorities and when the loads to be carried are for example of the same overall width of the transporter vehicle, the upper deck supports prevent vehicles of equivalent width thereto being carried since it is not possible to mount such loads from the rear of the vehicle over ramps for example as such loads would foul the upper deck supports. This is particularly so when the load is a vehicle such as a commercial load carrying vehicle having a portion such as the driver's cab as wide as the transporter vehicle itself and this could apply to loads in the form of chassis of vehicle with driver's cabs wider than the distance transversely of the transporter vehicle upper deck supports.

The main object of the invention is to provide a transporter vehicle in which the aforesaid disadvantages are minimised or eliminated.

SUMMARY

Another object of the invention is to provide a load carrying transporter vehicle for transporting wide loads and having a lower deck with a vertically adjustable upper deck comprising upper deck supports at the front and rear of the vehicle which while supporting the upper deck above the lower deck can be displaced sidewardly outwardly of the carrying vehicle to permit loads of a width greater than the width of the deck to be loaded longitudinally of the lower deck.

Another object is to connect the uper deck supports to the basic structure of the carrying vehicle and the upper deck by pivotal connections so as to swing outwardly to increase the transverse distance between them so that wide loads can be loaded lengthwise of the vehicle. The supports are preferably vertically variable in height as by being in the form of vertically telescopic hydraulic rams.

The rams or like means for raising and lowering the upper deck are preferably carried on free ends of arms, pivoted at their opposite end portions to the transporter vehicle lower and upper deck or chassis. In this construction the rams may be pivotally mounted in or on the arms to rotate about their vertical axes therein or thereon and connected to links the other ends of which slide in the side of the vehicle structure and have a limited movement with respect to the arms causing the rams to rotate as the arms near the extent of their travel and in so doing the horizontal pivot spindles of the rams are always maintained at right angles to the longitudinal centre line of the vehicle. This arrangement allows the rear of the upper deck to be raised or lowered with the arms in the folded in or swung out position.

BRIEF DESCRIPTION OF THE DRAWINGS

In order that the invention may be more fully understood some embodiments in accordance therewith will now be described by way of example with reference to the accompanying drawing in which:

FIG. 1 is a perspective rear view of a transporter vehicle in the erected position;

FIG. 2 is a diagrammatic plan view of the vehicle shown in FIG. 1;

FIG. 3 is a diagrammatic side elevation of a vehicle according to FIGS. 1 and 2 loaded with loads in the form of chassis of commercial vehicles;

In the drawings the same references are used to designate the same or similar parts.

DESCRIPTION OF THE PREFERRED EMBODIMENT

Figure 4:
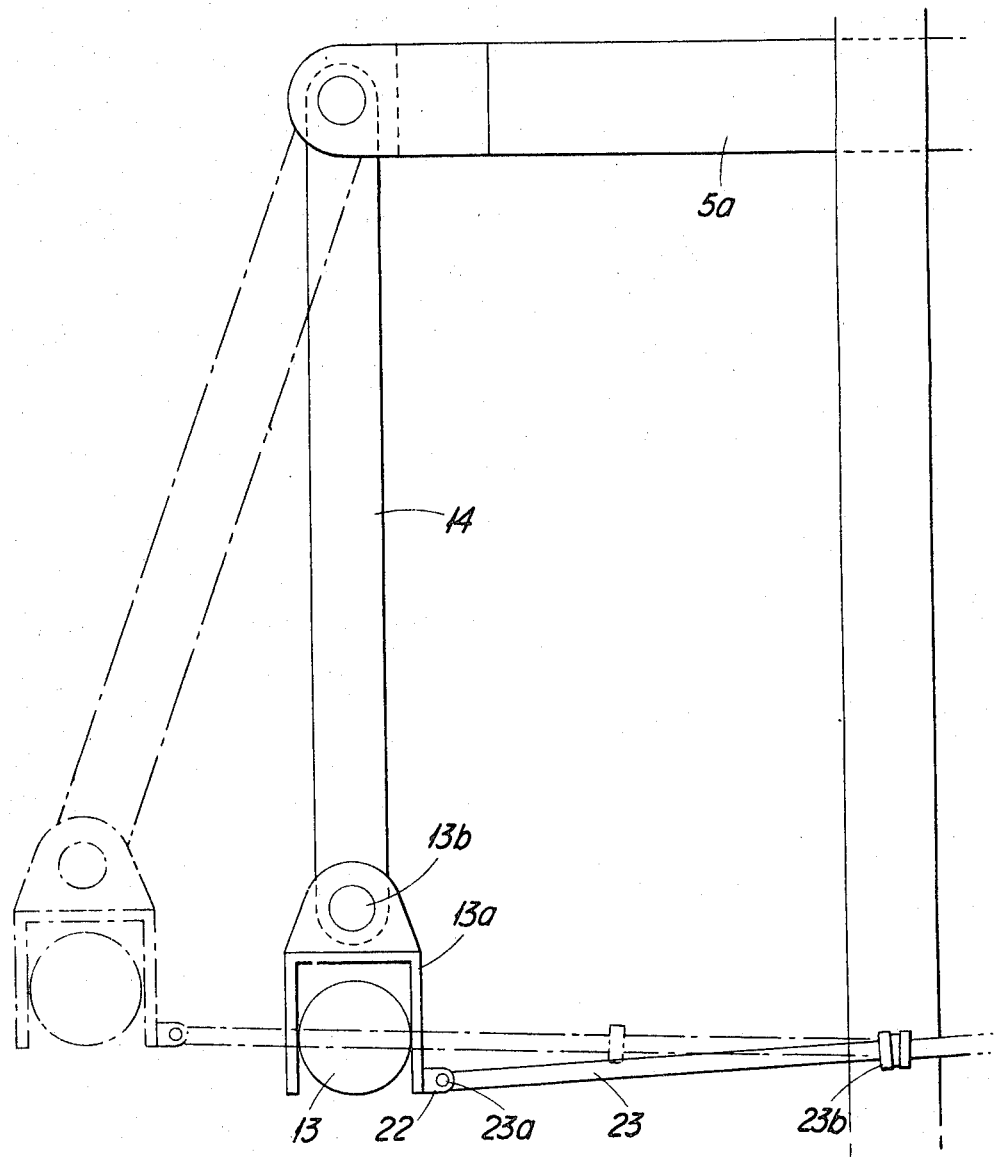
FIGS. 4 and 5 are plan views similar to FIG. 2 showing forms of linkage for folding movement of the rear supports for the upper deck.

Referring to the drawings, these show a transporter vehicle for transporting loads such as road vehicles including commercial road vehicles and chassis for vehicles, the vehicle having a tractor unit 1 of conventional construction and a trailer of the invention 2 coupled to the tractor at its forward end by such means as a fifth wheel coupling. Although these embodiments relate to a semi trailer vehicle articulation, nevertheless the structure of the load carrying portion of the vehicle may be the load carrying platform behind the driver's cab 31 of a standard self-propelled vehicle.

The semi-trailer 2 has a lower deck 3 mounted on the vehicle chassis of which the rear wheels 4 are visible and which is of conventional construction, and an upper deck 5 supported thereabove for additional loads.

The lower deck 3 has a forward portion 6 extending over the fifth wheel coupling close towards the rear of the driver's cab 31 which may be slightly upwardly inclined as shown in FIGS. 1 and 3 but depending on the height of the chassis with respect to the fifth wheel coupling plate on the tractor 1, it may be level with the portion 3.

The rear portion 7 may be fixed and as in FIG. 4 downwardly inclined or it may be hinged at 8 in a conventional manner to the rear portion of the deck 3 so that it can be lowered to the ground to form a ramp up which loads can be moved, or where the load is a vehicle, can be driven, onto the lower deck 3. In the latter construction the rear portion 7 can be hinged upwardly to form a back to the vehicle when it is in transit if desired. In that event suitable locking members of conventional construction may be employed but as this feature forms no part of the present invention it is not necessary to describe it further here.

The upper deck 5 in the position shown in FIG. 1 is supported at its front end 9 on a hinge pin 10 extending transversely of the vehicle between uprights 11 to be further described. Thus the upper deck 5 can be pivoted about the hinge 10 so that its rear end 12 can be brought down onto the rear of the portion 3 or onto a part preferably the rear of the portion 7 to enable loads to be moved onto the upper deck and then it can be raised again as it will be described.

The rear of the upper deck is supported on uprights 13, one at each side of the vehicle, which are adjustable in height by power operated means of any conventional construction to raise and lower the rear of the upper deck whether it be loaded or unloaded.

As shown in the drawings, the supports 13 are formed as telescopic units of hydraulic rams supplied with high pressure fluid, oil or air for example, from a source of pressure carried by the vehicle in the conventional manner. Similarly, the uprights 11 may also be vertically telescopic for raising and lowering the forward end of the upper deck.

As can be seen from FIG. 2 of the drawing, the supports 13 and 11 are normally recessed into the sides of the upper and lower decks to keep the width of the vehicle within permitted dimensions as laid down by traffic authorities. If the uprights are built to be outside the contour of the decks then the width of the decks must be reduced to maintain the overall width of the vehicle within the permitted limits. Thus the width of load is restricted in the conventional vehicle by the supports 11 and 13.

Such transporter vehicles are frequently used in transporting new cars from the car factory to the docks and other points of dispersal and since the average private car is narrower than the transporter vehicle there is no difficulty in loading these between the uprights 11 and 13. However, such vehicles cannot be used for transporting vehicles of the width of the transporter vehicles because they cannot be loaded between the uprights 11 and 13.

By the construction of the present invention this disadvantage is overcome. As shown in the drawings, the upright 13 on each side of the vehicle is mounted between arms 14, 15, the arm 14 being hinged to the chassis beneath the lower deck or to the underside of the lower deck, and the arm 15 is hinged to a member 5a (FIGS. 4 and 5) of the frame of the upper deck 5 or to the underside of the upper deck. Thus by swinging the arms 14, 15 out on each side of the vehicle the rear portion of the upper deck can be lowered or raised by the prime mover such as a hydraulic mechanism actuating the members 13 while the arms 14, 15 lie within the contour of the lower deck and the upper deck or when they are pivoted outwardly from the vehicle.

Similarly the uprights 11 are pivoted about pivots 16 to transoms 17 of the vehicle chassis and at their upper ends to a transom 18 beneath the front end of the upper deck to which the hinge 10 may be connected by brackets 19.

These support members 11, and/or the support members 13 on the arms 14, 15 may be swung inwardly and outwardly about their pivots with respect to the chassis and the decks by hand or by such hand operated devices as winches and cables or by mechanical means operated if necessary from the driver's cab or from beside the vehicle adjacent the uprights. Such power operated means may consist of hydraulic jacks indicated at 20, 21 mounted beneath the lower deck on the chassis or mounted on the underside of the lower deck. These hydraulic jacks are pivoted to the underside of the lower deck or chassis and pivoted to the bottoms of the supports or the arms on which they are mounted. Thus as the supports are pivoted out on the arms 14, 15 the hydraulic jacks will follow the arc traversed by the ends of the arms and the jacks will thus tend to swing out of the vertical. To prevent this swing of the supports 13 in the form of hydraulic jacks, the lower end of each member 13 in FIG. 1 has a rearwardly extending lug 22 to which is pivoted a rod 23 passing through a gap 24 in the chassis member 25 which ensures that as the rod 23 moves outwardly it will remain substantially normal to the longitudinal axis of the vehicle. At its inner end the rod 23 has a block or stop on it on the inside of the chassis member 25 so that when the arm 14 is fully outwardly extended the stop engages the member 25 and prevents further outward movement of the arm 14. At the same time, this rod remaining substantially normal to the longitudinal axis of the vehicle will cause the supports 23 to pivot in the arm 24 and thus keep them in vertical alignment.

Figure 5:
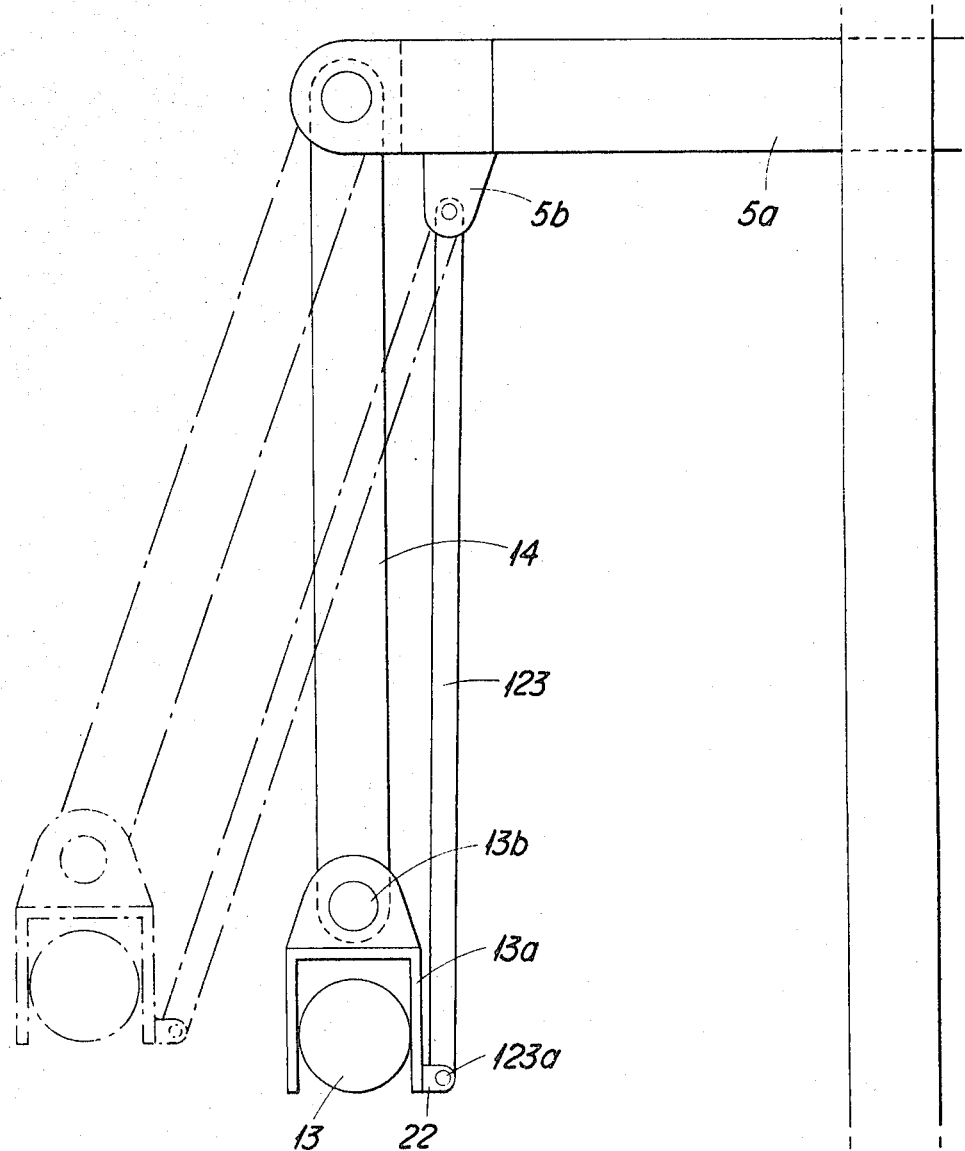

Referring to FIGS. 4 and 5 these show alternative constructions for preventing this swing of the jacks. In FIG. 4 the supports 13 in the form of hydraulic jacks are shown mounted to hinge brackets 13a pivoted at 13b to the outer ends of the arms 14, the brackets 13a having lugs 22. A rod 23 is pivoted at 23a to the lug 22 with a stop 23b thereon operating in a manner similar to that described with reference to FIG. 1. In FIG. 5 the member 5a has a horizontal lug 5b to which is pivoted about a vertical axis a rod 123 the other end of which is pivoted at 123a to the lug 22, the rod 123 and arm 14 thus acting as a parallel linkage, and a rod similar to the rod 23 in FIG. 1 or FIG. 4 may also be provided: any of these constructions may also be employed on the upper arms 15.

The arms 14 and 15 being of substantial length to ensure full clearance at the side of the decks will when operated cause supports 13 to make a rotary movement as the arms swing out due to the linkage as described with reference to FIGS. 1, 4 and 5 and this linkage may also act as a stop to prevent the arms being swung out further than is desirable.

A similar arrangement may be made with respect to the supports 11.

Figure 6:
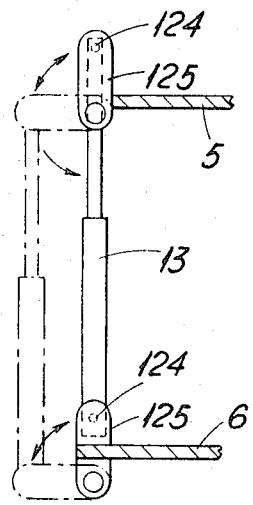
FIGS. 6 and 7 are elevations on one side of the vehicle along and across the vehicle respectively showing a form of linkage for moving the front and/or rear upper supports sidewardly outwardly of the decks; and, FIG. 8 is a view similar to FIG. 6 of another construction.
Figure 7:
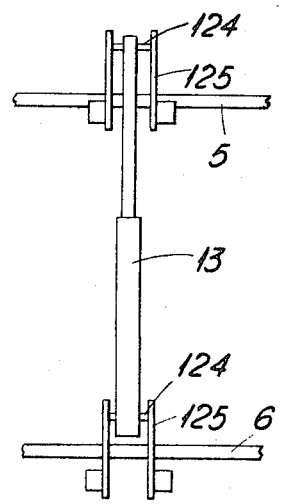
Figure 8:
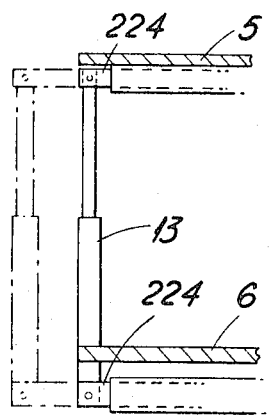

In an alternative construction shown in FIGS. 6 and 7, the supports 13 and/or the supports 11 could be hinged at 124 to cranks 125 in turn hinged to the upper deck and lower deck or chassis about the upper and lower ends respectively of the supports to transoms 5a on the upper and lower deck so that they can be made by suitable operating mechanism to swing outwardly about their lower and upper crank pivots and thus provide the clearance on the decks for mounting the loads thereon. In FIG. 8 the supports 11 and/or 13 are pivoted at the upper and lower ends to rods 224 sliding in or on the upper decks and lower decks or transoms.

Such transporter vehicles with adjustable deck supports are suitable for any wide loads and in particular the chassis of very wide vehicles where the cab is much wider than the ordinary chassis portion and thus the cab, as the chassis is mounted on the lower deck will pass the uprights and eventually come to rest in front of the uprights 11 which can then be returned to their position as shown in FIG. 1 and then the arms 14, 15 can be swung inwardly as described.

Thus by means of the invention the transporter vehicle of maximum width allowed by the travel authorities can be used to carry loads of the same width.

I claim:

1. A load carrying transporter vehicle comprising:
   a chassis;
   a lower deck supported by said chassis and having a contour defining a loading zone;
   an upper deck;
   deck support means for adjustably supporting said upper deck above and relative to said lower deck;
   said deck support means including:
      forward upper deck support means, one at each side of the forward portion of said lower deck, and
      rear upper deck support means, one at each side of the rear portion of said lower deck;
   mounting means for mounting at least said rear upper deck support means for movement between a retracted, travel position and an extended, loading position;
   said rear upper deck support means in said retracted position being substantially within said contour of said lower deck defining said loading zone to minimize the travel width of the vehicle;
   said rear upper deck support means in said extended position being displaced outwardly of said contour of said lower deck defining said loading zone to increase the loading width capacity of said lower deck; and
   at least said lower deck including means defining receiving recesses for receiving at least said rear upper deck support means in said retracted position.

2. A vehicle according to claim 1 wherein said upper deck support means comprise vertically adjustably hydraulic rams mounted between the free ends of upper and lower arms comprising said mounting means and pivoted at their other ends respectively to the upper deck and to said chassis.

3. A vehicle according to claim 2 wherein said mounting means comprises means pivotally mounting said upper deck support means with respect to said arms to rotate about their vertical axes, and connecting said upper deck support means at their upper ends to links the other ends of which are slidable in the side of said chassis and have limited movement with respect to said arms causing the supports to rotate as said arms near the limit of their travel so that horizontal pivot spindles of said support means are maintained at right angles to the longitudinal centre line of said chassis.

4. A vehicle according to claim 1 wherein said deck support means is operable to adjust said upper deck above and relative to said lower deck with the at least said rear upper deck support means in both said retracted and extended positions.

5. A vehicle according to claim 1 wherein said mounting means comprises means connecting said upper deck support means to the basic structure of the vehicle and to the upper deck by pivotal connections to swing outwardly with respect to the vehicle.

6. A vehicle according to claim 1 wherein said upper deck support means are variable in height.

7. A vehicle according to claim 1 wherein said upper deck support means comprise vertically telescoping rams.

8. A vehicle according to claim 1 wherein said mounting means comprises means connecting said upper deck support means pivotally about horizontal pivots to the upper deck and at their lower ends pivotally about horizontal pivots to elements secured to the outer ends of arms pivoted about vertical axes to the vehicle in the vicinity of the lower deck at their inner ends.

9. A vehicle according to claim 1 wherein said mounting means comprises means connecting said upper deck support means pivotally about horizontal axes to ends of links the other ends of which are pivoted about horizontal axes respectively to the upper decks and to the vehicle in the vicinity of the lower decks.

10. A vehicle according to claim 1 wherein said mounting means comprises means connecting said upper deck support means at their upper and lower ends to members slidably mounted in the vehicle to slide in a direction transversely of the vehicle longitudinal axis.

11. A load carrying transporter vehicle comprising a lower deck supported at least at the rear portion on road wheels, upper deck supports at the front and rear portions of the vehicle, and an upper deck supported by the supports and capable of being lowered at least at its rear end into close proximity with the rear portion of the lower deck, the upper deck supports being displaceable sidewardly of the vehicle for deck loading, said upper deck supports comprising vertically adjustable hydraulic rams mounted between the free ends of upper and lower arms pivoted at their other ends respectively to the upper deck and to the vehicle.

12. A vehicle according to claim 1 wherein the upper deck supports are pivotally mounted with respect to said arms to rotate about their vertical axes, and are connected at their upper ends to links the other ends of which are slidable in the side of the vehicle structure and have limited movement with respect to said arms causing the supports to rotate as said arms near the limit of their travel so that horizontal pivot spindles of the supports are maintained at right angles to the longitudinal centre line of the vehicle.

References Cited

UNITED STATES PATENTS

| 3,424,489 | 1/1969 | Hoy | 296—1 A |
| 2,985,482 | 5/1961 | Lion | 214—515 |
| 3,332,661 | 7/1967 | Hand | 214—515 X |

BENJAMIN HERSH, Primary Examiner

J. A. PEKAR, Assistant Examiner

UNITED STATES PATENT OFFICE
CERTIFICATE OF CORRECTION

Patent No. 3,720,437      Dated March 13, 1973

Inventor(s) John Robert Lambert et al

It is certified that error appears in the above-identified patent and that said Letters Patent are hereby corrected as shown below:

Column 1, in the heading, line 5, after "England", claims priority Great Britain 6357/71 filed March 9, 1971 -- .

Signed and sealed this 20th day of November 1973.

(SEAL)
Attest:

EDWARD M. FLETCHER, JR.
Attesting Officer

RENE D. TEGTMEYER
Acting Commissioner of Patents